Feb. 25, 1969

E. J. HALSETH 3,429,141

REFRIGERATIVE DISH

Filed Sept. 19, 1966

Evelyn J. Halseth
INVENTOR.

BY *Norman H. Buff*

Feb. 25, 1969

E. J. HALSETH 3,429,141

REFRIGERATIVE DISH

Filed Sept. 19, 1966

Evelyn J. Halseth
INVENTOR.

BY *Norman W. Huff*

United States Patent Office 3,429,141
Patented Feb. 25, 1969

3,429,141
REFRIGERATIVE DISH
Evelyn J. Halseth, E. 12724 8th Ave.,
Spokane, Wash. 99214
Filed Sept. 19, 1966, Ser. No. 580,435
U.S. Cl. 62—372                                     3 Claims
Int. Cl. F25d 3/08

ABSTRACT OF THE DISCLOSURE

A portable refrigerative dish of one piece construction having juxtaposed cavities opening oppositely to each other to contain foodstuff and ice in isolation from each other while transfer of heat between the cavities is optimum.

---

The present invention relates to processes for refrigerating foodstuff during transportation from place to place or otherwise necessitating displacement with respect to conventional refrigeration units for food storage and a contrivance for effecting the improved process. More particularly it is a process and contrivance to be used by conventional homemakers for facilitating the transporting and storage of refrigerative foodstuff from home to a remote place, as for example a picnic ground.

In the area of family pleasure and similar social endeavors it is largely desired to prepare foodstuff at a convenient location, for example in a conventional kitchen, and then transport it to another place to be consumed at a later time. The desire of one who is responsible for the menu to provide a meal of variety necessitates providing refrigeration, for without refrigeration the variety of foodstuffs available is restricted.

It is widely practiced to provide a portable ice chest in which a quantity of ice (blocks, cubes, crushed, etc.) is placed and then containers of various prepared foodstuffs are placed in the chest upon the ice or packed in it. While this is somewhat effective, far too frequently the experience has been less than desirable because the ice makes a notoriously unstable support for bowls, jars and other containers normally used in the average household. Therefore, after the usual bumpy ride to the picnic grounds by the gradually changing shapes of the ice occasioned by melting, the containers in a conventional ice chest under conventional conditions most likely will be found in much disarray with the foodstuff spilled and/or contaminated by water formed from melting ice seeping into the displaced containers.

It should also be noted that to secure effective refrigeration it is customary to use cubed or crushed ice. This requires a much greater portion of the ice chest capacity than does a block of ice but since the absorption of heat is proportional to the area exposed, use of block ice is much less efficient as conventionally used. From the standpoint of the amount of space taken by the block ice it is the most desirable form, but since its cooling efficiency is so restricted, it is seldom used in this form.

The present invention provides a method and means for refrigerating fodstuff under these situations while obviating all of the aforesaid undesireable features.

It is therefore one object of the present invention to provide a method and means for refrigerating foodstuff during transportation and storage away from conventional refrigeration.

Another object of the present invention is to provide a method and means for employing ice in the solid or unfractured configuration to utilize space most effectively and yet provide maximum area for heat transfer for most efficient refrigeration.

Still another object of the present invention lies in the provision of a refrigerative dish containing its own cooling medium and which together with other identical dishes will stack conveniently one upon another and be supported upon the flat surface of an insulated chest bottom so that reasonable bumping and jarring during normal handling will not displace the said dishes relative to each other and will most effectively employ the space in said insulated chest.

A further object of the present invention lies in the provision of means for conducting water melted from the ice to the outside of the next lower dish and thus preclude the possibility of contaminating the foodstuff in the receptacles thereof.

A still further object of the present invention is to provide a resilient deformable closure for the ice cavity of the refrigerative dish for maintaining the ice in physical contact with the receptacle walls for most efficient heat transfer during the initial phase of use when it may be desired to reduce the temperature of the foodstuff to a lower degree rapidly.

Yet another object is to provide a refrigerative dish having one or more receptacles for foodstuff and a sealing lid or cover for each receptacle.

These and other objects and attendant advantages of this invention will become better understood by reference to the following detailed description when considered in conjunction with the accompanying drawings wherein like reference numerals are employed to designate like parts throughout the several views.

While a preferred form of the invention is graphically illustrated in the several views of the drawings, it is to be understood that the drawings are illustrative only and are not intended to limit the scope of the invention. It should also be understood that various changes in construction may be resorted to in the course of manufacture without in any way departing from the spirit of the invention, which is to be understood only in accordance with the appended claims. Furthermore, it should be understood that while the invention is described in one particular field of utility it is not my intention to so limit the applicability of the invention but I desire to reserve to myself the claimed invention for every use of which it is now known or subsequently discovered to be susceptible.

Figure 1:
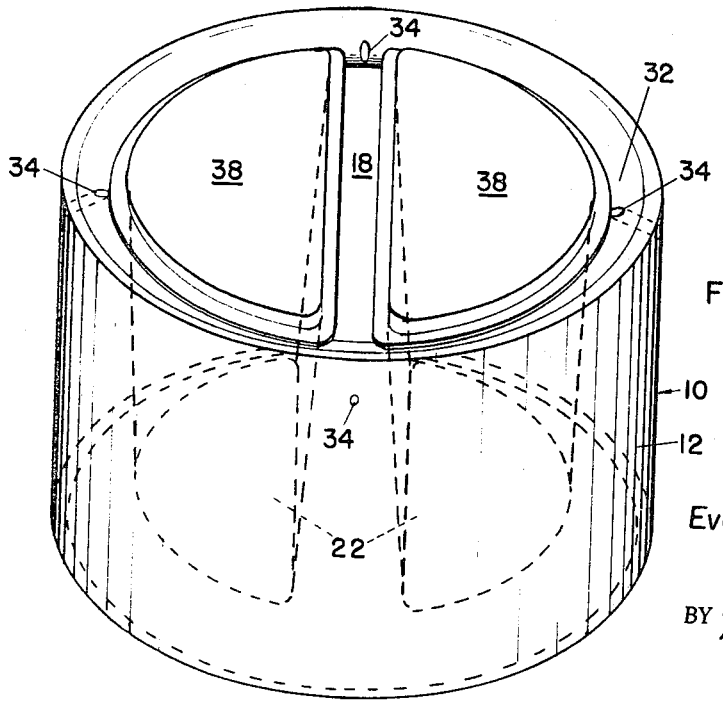
FIGURE 1 is an isometric view of a refrigerative dish embodying the inventive structure.
Figure 3:
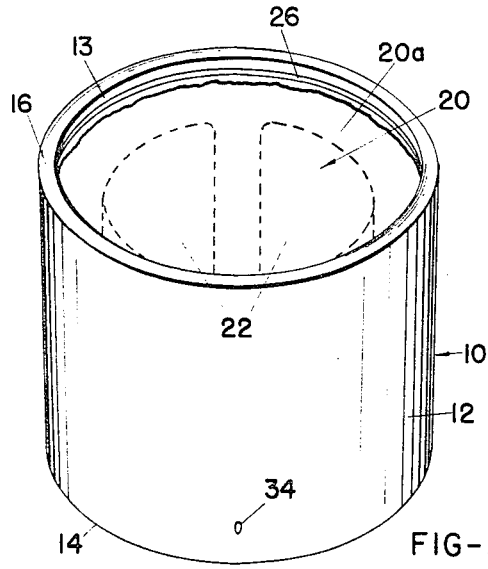
FIGURE 3 is a perspective view of the dish in the inverted position and having ice in the cavity thereof.
Figure 4:
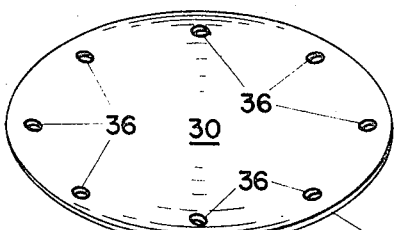
FIGURES 4 and 4 are respectively a perspective view and an edge view of the closure for the cavity.

Referring now in greater detail to the drawing views, in FIGURE 1, there is shown a refrigerative dish indicated in its entirety by the numeral 10. The dish preferably has a container body 11 molded from one of the now well known plastics utilized for this purpose and comprises an axially vertical peripherally continuous outer wall 12 terminating axially in an upper and a lower edge 14 and 16. The upper edge is shown to be convex while the lower edge 16 is shown to be concave and are of a size and configuration so that the opposed edges 14 and 16 of successive dishes will interact to facilitate stacking one dish upon another. The wall 12 is shown to be cylindrical but it will be readily apparent that other shapes will be equally effective so long as the shapes and sizes of dishes intended to be stacked are co-equal, at least in-sofar as the interfitting edges 14 and 16 are affected by the shape and size.

An impervious integral web 18 closes the upper end of the wall 12 and is disposed substantially at but slightly spaced from the upper end or edge 14 of the wall. Web 18 together with wall 12 defines a downwardly open cavity 20 within the container body 11. Receptacles 22—22 have open mouths 24—24 disposed above the web 18 but terminated short of the upper edge 14, in upper edge portions 22c. The remainder of each receptacle is comprised of side walls 22a which taper downwardly with respect to each other and are closed at the bottom walls 22b. This said remaining portion, that is all except the upper edge portions 22c extend downwardly from the web 18 into the cavity 20 and terminate with their bottom walls 22b spaced inwardly of said cavity from the lower edge 16.

Figure 2:
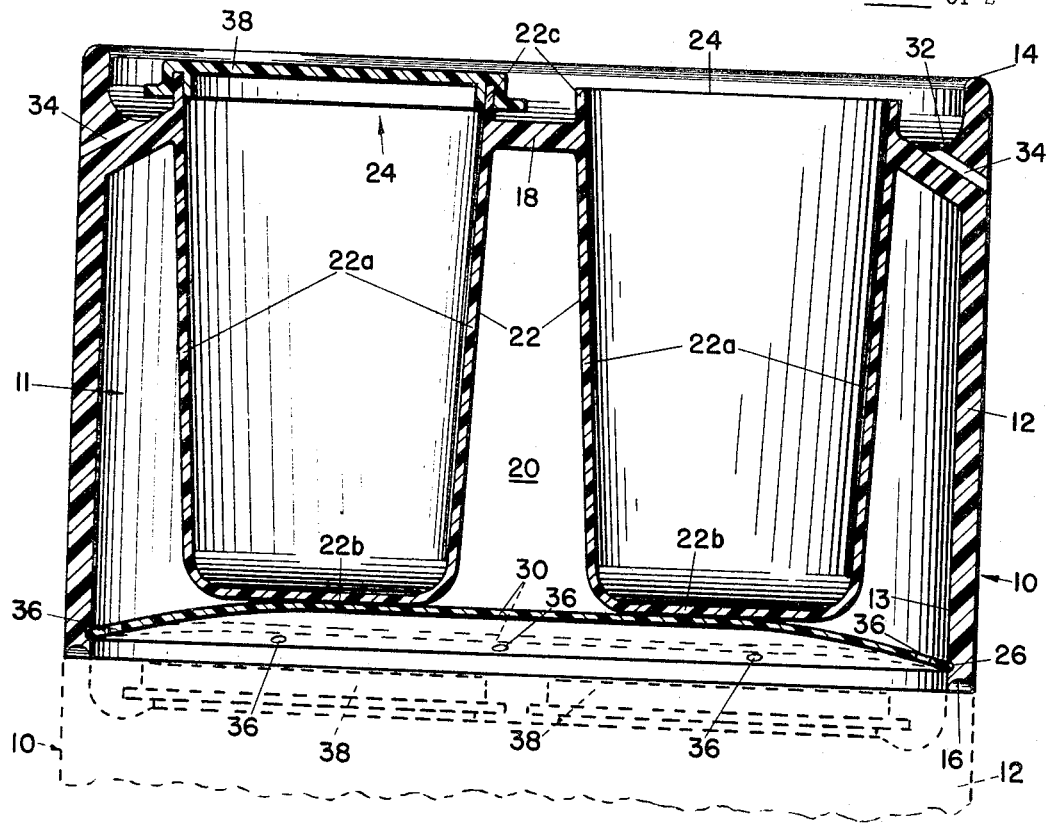
FIGURE 2 is a diametric section through the dish of FIG. 1.
Figure 5:
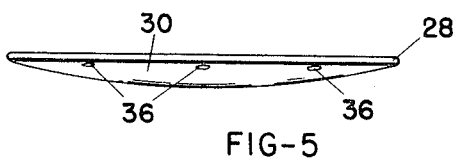

Adjacent to its lower edge 16, on its inner face 13, the wall 12 is provided with a peripherally continuous groove 26 adapted to receive the peripheral rounded edge 28 of the closure 30 which is formed of a resilient deformable plastic and is bowed or dished as seen in FIGURES 2 and 5.

Figure 6:
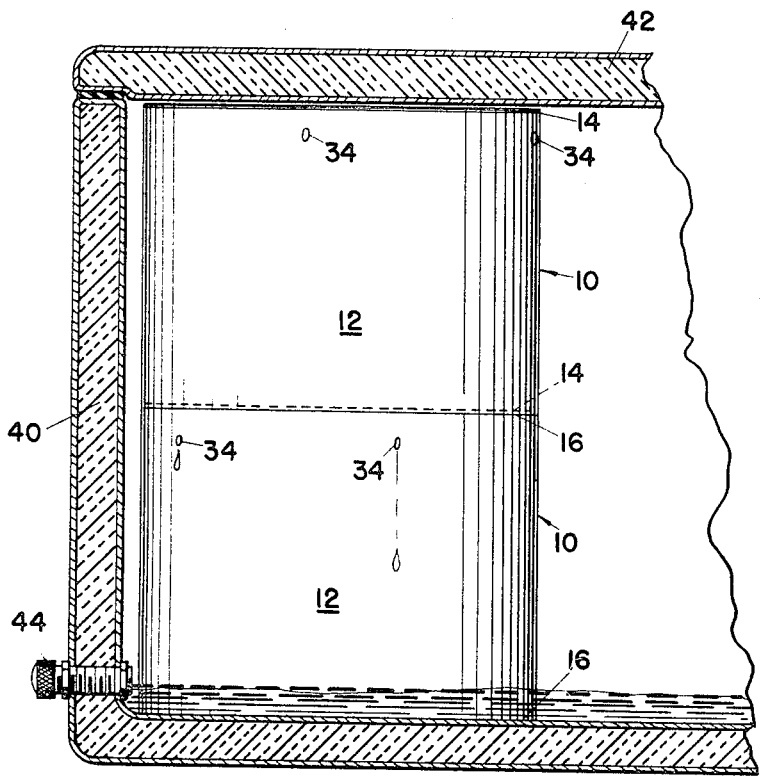
FIGURE 6 is an elevational view of two stacked dishes disposed within an insulated chest shown in vertical, longitudinal, fragmentary section.

At the juncture of the web 18 with the wall 12 on the face opposed to cavity 20 I provide a peripheral recessed groove 32 forming a depression with respect to the top face of web 18. This groove 32 provides means to facilitate drainage by gravity away from the mouths 24 of receptacles 22. To further drain any liquid away from this area, I provide drain ports 34 which extend through the wall 12 and open into the said groove 32 at its bottom and outwardly of the wall 12. Since these drain ports 34 angle downwardly toward the outside of the wall 12, any liquid capable of flowing therethrough by gravity will be discharged on the outer face of wall 12 as seen in FIGURE 6.

The bottom 30 is provided with a number of drain holes 36 which permit water formed from melting ice to escape from the cavity 20. The dished or bowed configuration of the closure 30 has two desirable functions. That is, as the ice melts, it normally would recede from the walls 22a and 22b of the receptacles 22—22. The resilient closure 30 exerts upward pressure upon the ice and lifts it to maintain contact with the walls 22a and 22b until movement of the closure toward its normal dished or bowed configuration is stopped by impinging against the bottom walls 22b of the receptacles 22. This force which lifts the ice simultaneously with maintaining it in contact with the walls 22a and 22b of the receptacles 22 also removes the ice from the drain holes 36 and thus precludes the gathering of any appreciable quantity of water in the dish cavity 20. Since the wall 12 is axially parallel, the ice when it melts enough will recede therefrom forming a thin airspace between the outer wall and the ice thus retarding heat transfer at these points. It is also to be noted that the side wall 12 is substantially thicker than the walls 22a and 22b and thus will absorb much more heat themselves before transmitting it to the ice, thus further increasing the efficiency of heat transfer from the foodstuff (not shown) in the receptacles through the walls 22a and 22b. Also since the cups 22 extend downwardly, the water formed by melting between the surface of the ice and the walls 22a and 22b will be trapped to further enhance heat transfer from the cups to the ice. Obviously as the ice moves upwardly water will be displaced by the cups 22 and will flow over the top of the ice and downwardly between the wall 12 and the ice 20a and out the drain holes 36, into the groove 32 of the next lower dish 10 and thence out the drain ports 34.

The marginal edge portions 22c which define mouths 24 are adapted to receive pliant plastic covers 38 which seal therewith in the now well known manner.

*Method of use*

The dish 10 with the bottom 30 removed is inverted bottom side up and a quantity of water capable of filling the cavity to a level just below the groove 26 is introduced into the cavity 20. The dish with the water therein in its inverted position is then subjected to freezing temperatures by placing it in a conventional freezing compartment of a refrigerator or deep freeze unit for a period of time at least sufficient to freeze the water. In actual practice, space permitting, the dishes will probably be stored in the freezing atmosphere with the ice in them for instant use in most households. When it is desired to use the dishes for the purposes aforesaid, the bottom closure 30 is forced into position by pushing the edge 28 into the groove 26 thus deforming the bottom and biasing the ice toward the web 18. The dish is then turned upright and the foodstuff (not shown) is placed in the receptacles 22—22 whereupon the lids or covers 38 are applied. The dish may then be stacked on another dish 10 or more, and the stack or single dish is then placed in an insulated chest 40 of the type having a closure means 42 manually openable for access and having a valved drain spout 44 of any conventional construction. This will enable one to prevent leakage of water during transporting of the assembly where this is desirable and yet facilitate draining the melted water upon arrival at a destination.

It is thus obvious that I have provided a method and means for refrigerating foodstuff while remote from the usual household refrigerator, which method and means utilize water, the most inexpensive coolant available, and provide for easy convenient packaging not liable to be disarrayed during normal use and handling and which is very efficient in providing refrigeration.

Thus having clearly described my invention, I particularly point out the novel features in the appended claims wherein I claim as new and desire to secure by Letters Patent of the United States, the following:

1. A portable foodstuff refrigerative dish comprising:
    a container body having a cavity;
    said body having an axially vertical peripherally continuous outer wall defining the peripheral limits of said cavity;
    an impervious web closing one end of said wall substantially at the upper terminus thereof;
    at least one foodstuff receptacle extending into said cavity and having an open mouth opening through said web opposed to said cavity with said receptacle disposed relative to said cavity for conductive heat transfer therebetween;
    said cavity being open downwardly when said dish is in its upright position;
    a closure removably affixed to close the end of said wall opposed to said web; and
    said closure being resilient and bowed upwardly into said cavity whereby to be deformable by ice inside said cavity below said receptacle and serving to urge said ice into contact with said receptacle.

2. The invention in accordance with claim 1 and further characterized by:
    said wall having at least one drain port therethrough disposed adjacent to said web and opposed to said cavity.

3. The invention in accordance with claim 2 and further characterized by:
    said web being spaced downwardly from the mouth of said receptacle and having a recessed groove at its juncture with said wall, whereby to provide for drainage away from said receptacle mouth and through said drain port to the outside of said container.

References Cited

UNITED STATES PATENTS 1,095,023  4/1914  Parker _____ 62—457 X
2,032,130  2/1936  Jurkat et al. _____ 62—457
3,255,607  6/1966  Bair et al. _____ 62—530 X

FOREIGN PATENTS 1,309,333  10/1962  France.

ROBERT A. O'LEARY, *Primary Examiner.*

W. E. WAYNER, *Assistant Examiner.*

U.S. Cl. X.R.

62—457, 530